Nov. 12, 1929. A. M. JOHNSON 1,735,401
BAND BRAKE STOP FOR DRILL FEED SHAFTS
Filed July 1, 1926
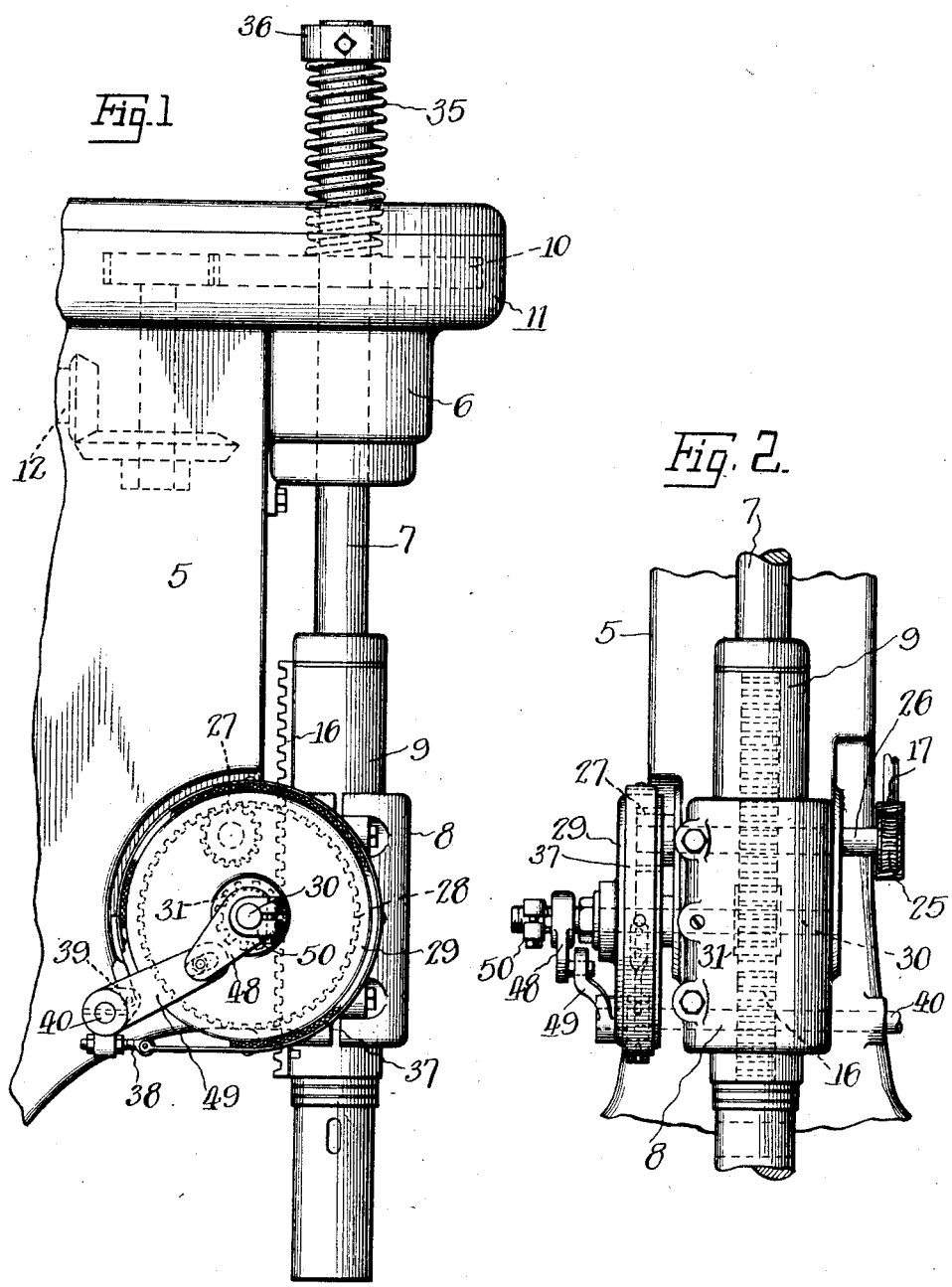

Patented Nov. 12, 1929

1,735,401

UNITED STATES PATENT OFFICE

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS

BAND-BRAKE STOP FOR DRILL FEED SHAFTS

Application filed July 1, 1926. Serial No. 119,839.

The invention has general reference to a brake mechanism for the tool spindle of a drilling machine or the like and is especially applicable to machines of the type in which the tool spindle is mounted for up and down movements in a stationary tubular bearing or head, with feed mechanism adapted to release the spindle at a predetermined point in its downward movement, and means such as a spring for returning the spindle rapidly to raised position.

In machines of this type, the tool spindle usually carries a part or parts which when the spindle is released for upward movement would strike the framework of the machine a sharp blow under the action of the spindle returning means, unless otherwise restrained. It is the object of this invention to provide a brake mechanism for the spindle which is automatically operable in the upward movement of the spindle to arrest its travel at a predetermined point and thus avoid strain upon the parts due to an impact against the frame as set forth.

As ordinarily constructed the pool spindle of a drill press or other machine is permitted to return to a position away from the work which is the same regardless of the character of the work being operated upon. In some instances, therefore, the spindle in its return movement travels through a substantially greater distance than is necessary to clear the work for the purpose of removing and replacing the same. Consequently the downward feeding movement of the spindle is necessarily prolonged with a resulting waste of time, and increased wear and tear upon the machine. An important object of my invention is to provide means which is readily adjustable to vary the length of stroke of the tool spindle in accordance with the character of the work, and operating to limit the return stroke of the tool spindle whereby to stop the spindle in its return movement at a point which is just sufficiently remote from the work to enable its insertion and removal.

A general object is to provide a brake device which is effectual in operation and which is simple in construction and capable of being manufactured economically.

In the accompanying drawings I have illustrated a preferred embodiment of my invention, but it is contemplated that various changes may be made in the construction and arrangement set forth by those skilled in the art without departing from the spirit and scope of the invention as expressed in the appended claims.

Figure 1 of the drawings is a fragmentary side elevational view of a drilling machine having my improved brake device applied thereto.

Fig. 2 is a fragmentary front elevational view illustrating the brake device.

The machine selected for purposes of illustration comprises a frame generally designated by the numeral 5 having an upper bearing 6 through which the tool spindle 7 is vertically slidable. The frame also has a tubular head or bearing 8 in which is mounted for vertical sliding movement a sleeve 9 held against longitudinal movement on the spindle but permitting rotation if the spindle by means of a gear 10 splined on the upper end of the spindle and enclosed within a housing 11 rigid with the frame 5. A driven shaft 12 communicating with a suitable source of power (not shown) is suitably connected with the gear 10.

The spindle sleeve 9 is equipped with the usual rack bar 16 upon its rear face, forming part of the feed mechanism which in the present instance comprises a worm 17 connected with the source of power and mounted for movement into and out of mesh with a worm wheel 25 on a countershaft 26 journalled in the frame of the machine. The opposite end of said countershaft on the side of the frame opposite the gear 25 has a pinion 27 meshing with an internal gear 28 formed integral with a drum 29 which constitutes a housing for the gearing at this side of the machine. The drum 29 is mounted upon a cross feed shaft 30 so as to rotate therewith and on said shaft is a pinion 31 meshing with the rack 16.

The worm 17 is arranged to be swung for movement into and out of engagement with the worm wheel 25 to control the operation of the spindle 7 by the feed mechanism. Any suitable means may be employed for this purpose.

Downward movement of the spindle 7 occurs against the action of a coiled expansion spring 35 encircling the upper end of the spindle projection above the housing 11 and bearing at its upper end against a collar 36 fast upon the upper end of the spindle. The controlling means for the feed mechanism is operated when the spindle has been moved downwardly to a predetermined depth, to release the spindle to upward movement by the spring 35, through the disengagement of the worm 17 from the worm wheel 25.

It will be apparent that in such upward travel of the spindle under the impulse of the spring 35 the sleeve 9 would, unless otherwise restrained, strike the bearing 6, and since the spindle travels upwardly at a relatively high speed it is desirable to prevent any such impact against the frame.

Also it will be observed that unless restrained the spindle will, when released, travel upwardly through a fixed range of movement regardless of the character of the work upon which the spindle is operating. In some instances this distance may be unnecessarily great, and the result is that the downward feeding movement will be unnecessarily prolonged.

The means which I have provided for limiting the return travel of the spindle for the purpose above set forth comprises a brake member in the form of a band 37 encircling and adapted to be moved into and out of frictional engagement with the outer periphery of the drum 29 constituting in addition to its other functions, a brake drum. Herein the brake band has one end secured to an adjustable anchoring device 38 and its other end secured to an arm 39 fast upon a horizontal shaft 40, journaled in the frame.

To move the brake head 37 into engagement with the drum 29 in the upward travel of the spindle, I employ an arm 48 which is screw-threaded on the feed shaft 30, and is pivotally connected with an arm 49 fast on the shaft 40. A stop 50 is adjustably secured on the shaft 30 and the parts are so arranged that when the spindle is released for upward movement through the action of the spring 35, the arm 48 being held against rotation moves outwardly until it engages the stop 50. Thereupon the arm 48 is swung by the shaft in a direction to apply the brake band 37 to the periphery of the drum 29, thus arresting the travel of the spindle. It will be observed that the means for operating the brake device including the feed shaft 30 geared to the spindle sleeve, the arm 48 traveling on this shaft, and the connections between the arm 48 and the brake band constitutes in effect a lost motion connection between the spindle and the brake device, whereby at a predetermined point in the return travel of the spindle the brake is applied.

In the operation of the device the spindle 7 is moved to a position where it will just clear the work upon which it is to operate. The stop 50 is then adjusted to engage the arm 48 at this point. Under the feeding action of the worm 17 and worm wheel 25 through the agency of the meshed gears 27 and 28 the drum 29, feed shaft 30, pinion gear 31 and rack 16, the sleeve 9 and spindle 7 are fed downwardly against the force of the spring 35. At the same time the arm 48 having a screw-threaded engagement with the shaft 30, but being held against rotation thereon by the arm 49, is caused to travel inwardly on the shaft 30. When the spindle 7 has been fed downwardly to a predetermined depth the worm 17 is disengaged from the worm wheel 25 allowing the spindle to be moved rapidly upward under the force of the spring 35. The direction of rotation of the shaft 30 is reversed and the arm 48 is caused to travel outwardly on the shaft 30 until it engages the stop 50. The arm 48 will thereupon swing downwardly moving the arms 49 and 39 to tighten the brake-band 37 around the drum 29 and check the upward travel of the spindle without jar.

This construction, it will be observed, is exceedingly simple in character and yet is very effectual in operation. Obviously it may be adjusted readily so as to bring the spindle to rest at any desired point in its upward travel.

I claim as my invention:

1. A drilling machine or the like having, in combination a tool spindle, a sleeve on said spindle having a rack thereon, a shaft geared to said rack for rotation in timed relation to the movements of the spindle, and friction brake means for said shaft and operatively connected thereto so as to be actuated thereby at a predetermined point in the travel of the spindle to stop the movement of the spindle.

2. A drilling machine or the like having, in combination, a tool spindle, a sleeve on said spindle having a rack thereon, a shaft geared to said rack for rotation in relation to the movements of the spindle, a drum connected with said shaft so as to rotate therewith, a brake element, and means for moving said brake element into engagement with said drum, said means including a fixed part on said shaft, and a part threaded on said shaft for a limited relative movement thereon toward and from said fixed part, said movable part being connected to said brake element and upon engagement with said fixed part at the end of the limit of movement being operable by said fixed part to actuate said brake element.

3. A drilling machine or the like having, in combination, a longitudinally movable tool spindle, a shaft threaded at one end and arranged to rotate with the longitudinal movements of said spindle, a drum rigidly mounted on said shaft, braking means encircling and adapted to frictionally engage said drum, said means having an arm mounted on the threaded portion of said shaft and arranged to travel thereon in the movements thereof with said tool spindle, and a stop member adjustably mounted on said threaded portion and so positioned as to be engaged by said arm during the travel thereof on said threaded portion of said shaft, the arrangement being such that the braking means is adapted to engage said drum when the traveling arm engages said stop member.

4. A drilling machine or the like having, in combination, a longitudinally movable tool spindle, a shaft threaded on one end and arranged to rotate with the longitudinal movements of said spindle, a drum mounted to turn with said shaft, a brake device having a band adapted to frictionally engage said drum, an arm mounted on the threaded portion of said shaft and arranged to travel thereon in the movements thereof with said tool spindle, a stop member adjustably mounted on said threaded portion and so positioned as to be engaged by said arm during the travel thereof on said threaded portion of said shaft, and a rocker arm mounted to swing on an axis parallel to said shaft, said rocker arm having operative engagement with the free end of said traveling arm, and with said band, whereby movement of said traveling arm with the shaft will cause said brake band to engage said drum.

5. A drilling machine or the like having, in combination, a tool spindle, a feeding sleeve in which said spindle is rotatably mounted, a shaft having a pinion meshing with said sleeve, a drum on said shaft and connected therewith, power means for rotating said drum to impart longitudinal movement to the spindle, a brake element, and means for moving the brake element into engagement with the drum at a predetermined point in the travel of the spindle, the last mentioned means comprising an arm having a limited lost motion connection with said shaft and an operative connection with said brake element.

6. A drilling machine or the like having, in combination, a longitudinally movable tool spindle, disengageable feed mechanism operatively connected with the spindle to move it in one direction, means acting independently of the feed mechanism when the latter is disengaged to return the spindle rapidly, said feed mechanism further including a shaft having a gearing connection with the spindle, a brake device, and a part having a lost motion connection with said shaft and operable at a predetermined point in the return movement of the spindle to actuate said brake device.

7. The combination in a machine tool, of a longitudinally movable tool spindle, a shaft operatively connected to said spindle for rotation on timed relation to the longitudinal movements of the spindle and having a stop thereon, a rocker member operatively associated with said shaft and adapted to engage with said stop so as to be movable by the shaft at a predetermined point in the movement of the spindle in one direction, and friction brake means operable by said rocker member upon movement of the latter by the shaft to stop said spindle at the end of the movement in said one direction.

8. The combination with a longitudinally movable tool spindle in a machine tool, a shaft operatively connected to said spindle for movement in timed relation thereto, a friction brake device for said shaft, and a lost motion connection between the shaft and said brake device whereby said device is operated by the shaft at a predetermined point in the movement of the spindle in one direction to stop the rotation of said shaft, said lost motion connection including two relatively movable parts, one of which has an interlocking engagement with said shaft at a predetermined point in its rotation so as to be connected to the spindle, and the other of said parts is connected to the brake device.

9. A drilling machine or the like having, in combination, a longitudinally movable tool spindle, a shaft operatively connected with said spindle so as to rotate in timed relation to the longitudinal movements of the spindle, said shaft being threaded over a portion of its length, a fixed stop on said threaded portion, a movable stop having a threaded engagement with said threaded portion for movement into and out of engagement with said fixed stop upon movement of said spindle in opposite directions, and a brake device for said shaft, said movable stop being operatively connected to said device to apply the latter to said shaft upon rotation with said fixed stop.

In testimony whereof, I have hereunto affixed my signature.

ALBERT M. JOHNSON.